(12) United States Patent
Su

(10) Patent No.: US 8,779,313 B2
(45) Date of Patent: Jul. 15, 2014

(54) MODULE MOLDING TOUCH MODULE

(75) Inventor: Sheng-Pin Su, Jhongli (TW)

(73) Assignee: TPK Touch Solutions Inc., Taipei (TW)

( * ) Notice: Subject to any disclaimer, the term of this patent is extended or adjusted under 35 U.S.C. 154(b) by 1749 days.

(21) Appl. No.: 11/963,796

(22) Filed: Dec. 22, 2007

(65) Prior Publication Data
US 2009/0101487 A1    Apr. 23, 2009

(30) Foreign Application Priority Data
Oct. 23, 2007   (TW) ............................... 96139592 A

(51) Int. Cl.
  *H01H 1/10*    (2006.01)
(52) U.S. Cl.
  USPC ........................................................ 200/512
(58) Field of Classification Search
  USPC ........................................................ 200/512
  See application file for complete search history.

(56) References Cited

U.S. PATENT DOCUMENTS

| 6,897,390 B2 * | 5/2005 | Caldwell et al. ............... 200/512 |
| 2006/0042924 A1 * | 3/2006 | Ito ................................... 200/512 |
| 2006/0102463 A1 * | 5/2006 | Cok ............................... 200/512 |

FOREIGN PATENT DOCUMENTS

| TW | M274735 | 9/2005 |
| WO | 00/39883 | 7/2007 |

* cited by examiner

*Primary Examiner* — Vanessa Girardi
(74) *Attorney, Agent, or Firm* — Gokalp Bayramoglu

(57) ABSTRACT

An in-mould molding touch module includes a flexible printed circuit having a touch control circuit, and a molding flexible film. The flexible film contains integratedly the flexible printed circuit by an in-mould injecting mode. The flexible film has an outer surface for touch control. The outer surface is configured for being pressed for driving the touch control circuit of the flexible printed circuit to output signals. Therefore, the present touch module is manufactured simply, and has a thin thickness.

4 Claims, 4 Drawing Sheets

MODULE MOLDING TOUCH MODULE

1. FIELD OF THE INVENTION

The present invention relates to in-mould molding touch modules, and more specifically, to a module technology employing an in-mould injecting technology to contain a flexible printed circuit for touch control.

2. DESCRIPTION OF THE RELATED ART

The in-mould injecting technology is widely used in the industry for molding some plastic products. The in-mould injecting technology employs a mold having a cavity corresponding to an object, which would be molded. Melting plastic is injected into the cavity to produce a molded object.

Furthermore, the in-mould technology in the industry includes an in mold label (IML) technology, which inserts an attaching object into the cavity, and then injects the melting plastic into the cavity to contain the attaching object for manufacturing a one-piece object. A patent WO No. 00/39883 discloses an antenna and a method for manufacturing the same, which employ the IML technology. The technology of the patent inserts a plate having a conducting ink antenna circuit printed thereon into a cavity of a mold; and then injects molding material into the cavity to manufacture the product containing an embedded antenna circuit therein, for protecting the antenna circuit and preventing the antenna circuit from fretting and renting. However, the technology is not developed to be used to manufacture the touch panel in industry.

Relating to touch panels, flexible printed circuits (FPC) are widely used for touch control, such as, keyboards of computers. The flexible printed circuit respectively has a reticular touch control circuit formed thereon. Fingers of users serve as an intermedium to touch and press the flexible printed circuits, such that the touch control circuits are connected to produce current signals or voltage signals for distinguishing coordinate values. The signals are then converted and outputted into hosts for performing touch commands.

However, the above flexible printed circuits need to be combined with a casing in process, for being the touch panels of the electronic products. The above flexible printed circuits need to be attached in a pre-molded cavity of the casing. Therefore, the process is complex, and costs time. Furthermore, other problems, such as, a ladderlike thickness because of attaching, and a gap of joint surfaces to be prone to congregate dust, need to be solved.

In addition, the patent WO No. 00/39883 discloses a method for containing the antenna by the IML technology, and fails to disclose applying the above flexible printed circuits having touch control circuits to the touch panel. There is no relative technology to disclose whether a one-piece touch module may be manufactured by the in-mould injecting technology.

What is needed is an in-mould molding touch module, which can solve the above problems.

BRIEF SUMMARY

An in-mould molding touch module, in accordance with a preferred embodiment of the present invention, includes a flexible printed circuit having a touch control circuit, a molding flexible film containing integratedly the flexible printed circuit by an in-mould injecting mode. The flexible film has an outer surface for touch control.

The touch module may be used as a touch panel of an electronic product. The touch module may be arranged in a casing of the electronic product to drive the touch control circuit of the flexible printed circuit by pressing the outer surface. Therefore, the ladderlike thickness and a gap arranged between the joint surfaces in the conventional art may be eliminated, and no dusts congregate therein. The process of the present invention is simple, and the touch module has a thin thickness, which is advantageous to the thin design. The flexible film may be made of rubber. The outer surface of the flexible film has a plurality of pressed portions for distinguishing the touch control positions of the flexible printed circuit. The outer surface and the pressed portions are one-piece. Each of the pressed portions has a pressed key formed thereon. The flexible film further includes an inner surface for supporting. The inner surface is attached in the casing. The inner surface has a plurality of supporting portions attached on a circuit board in the casing for supporting the flexible film and the flexible printed circuit, and the supporting portions correspond to the pressed portions respectively for supporting and contact the bottom of the touch control positions of the flexible printed circuit. The inner surface and the supporting portions are one-piece.

Other objects, advantages and novel features of the invention will become more apparent from the following detailed description when taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
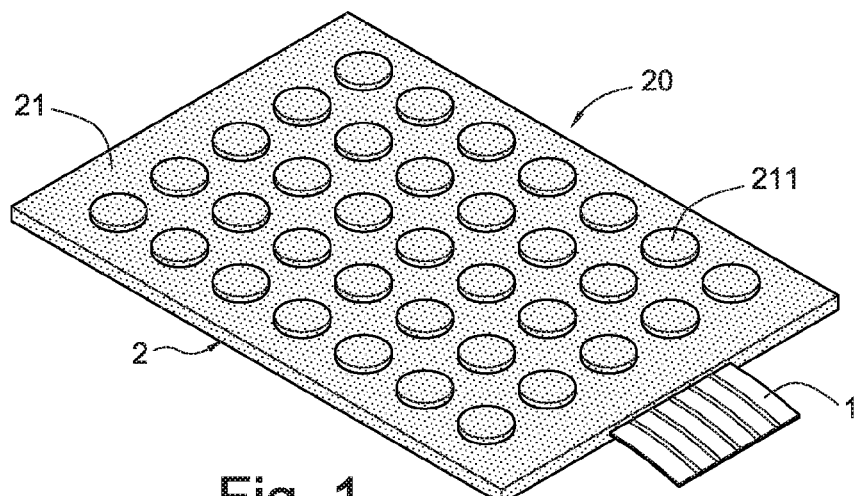
FIG. 1 is a schematic, exploded-view of an in-mould molding touch module of a preferred embodiment of the present invention, showing that a flexible film contains integratedly a flexible printed circuit.

Reference will now be made to the drawings to describe a preferred embodiment of the present in-mould molding touch module, in detail.

Referring to FIGS. 1 to 4, an in-mould molding touch module 20 is shown, in accordance with a preferred embodiment of the present invention. The in-mould molding touch module 20 includes:

a flexible printed circuit 1 having a touch control circuit 10;

a molding flexible film 2 containing integratedly the flexible printed circuit 1 by an in-mould injecting mode, the flexible film 2 having an outer surface 21 for touch control.

Figure 2:
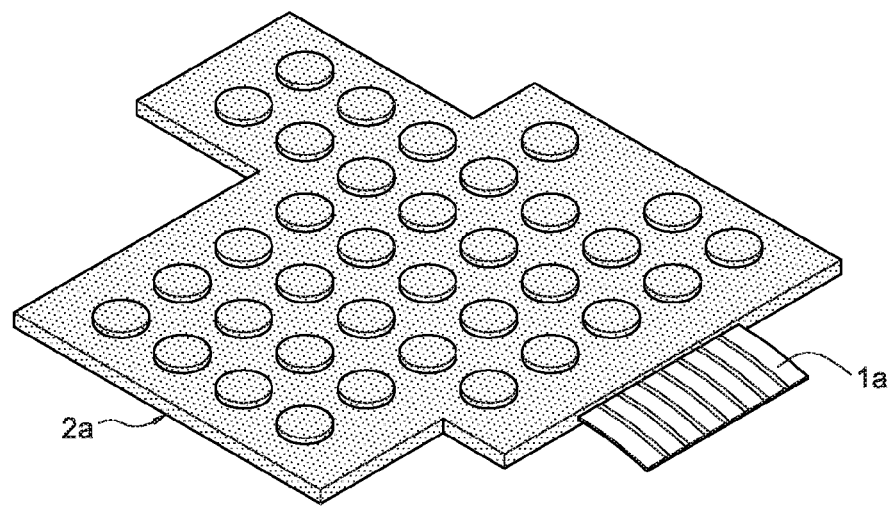
FIG. 2 is another schematic, exploded-view of the in-mould molding touch module, showing that the flexible film has an irregular shape corresponding to the contour of the flexible printed circuit.

The flexible printed circuit 1 having the touch control circuit 10 is manufactured by stacking a plurality of flexible printed circuits. The touch control circuit 10 is a reticular interlaced circuit. The touch control circuit 10 has a plurality of touch control positions 101. Each of the touch control position 101 has a first conducting terminal 11 and a second conducting terminal 12 spaced to the first conducting terminal 11. A flexible film 2a may be an irregular shape (as shown in FIG. 2) corresponding to the contour of a flexible printed circuit 1a.

Figure 3:
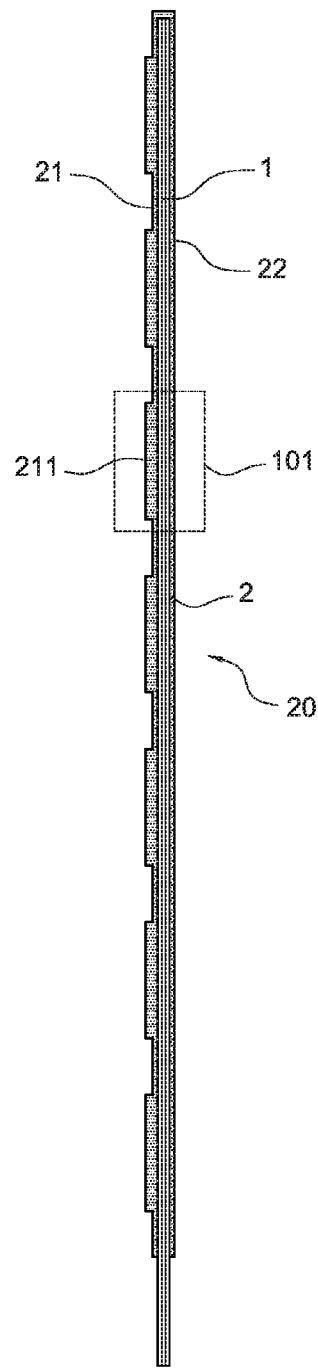
FIG. 3 is a schematic, crossed-section view of the in-mould molding touch module, showing that an outer surface of the flexible film has a plurality of pressed portions for distinguishing touch control positions of the flexible printed circuit.
Figure 4:
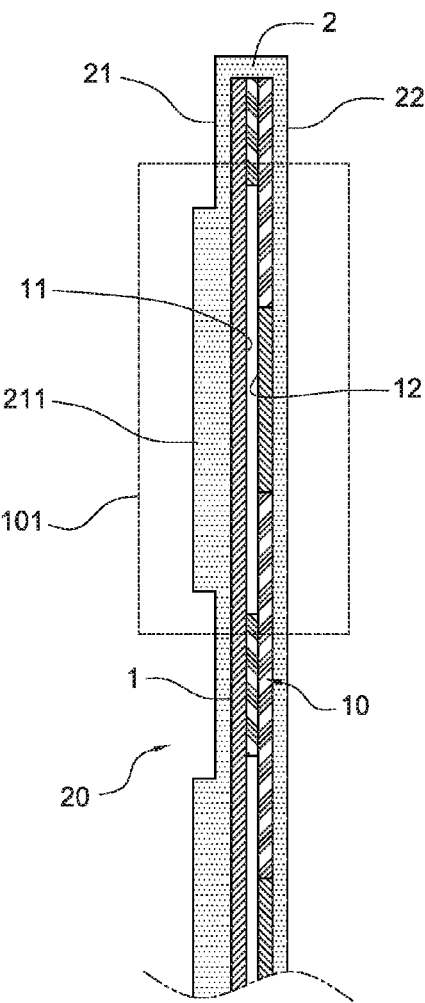
FIG. 4 is a schematic, part-enlarged view of FIG. 3, showing that touch control positions of a touch control circuit have a plurality of first conducting terminals and a plurality of second conducting terminals spaced to the corresponding first conducting terminals.

In a more specific embodiment, the flexible film 2 is manufactured by injecting rubber at 130-centigrade degrees. The outer surface 21 of the flexible film 2 has a plurality of pressed portions 211 formed thereon to distinguish the touch control positions 101 of the flexible printed circuit 1 (as shown in FIGS. 1, 3 and 4). The outer surface 21 and the touch control positions 101 are one-piece. The flexible film 2 further has an inner surface 22 for supporting.

Figure 5:
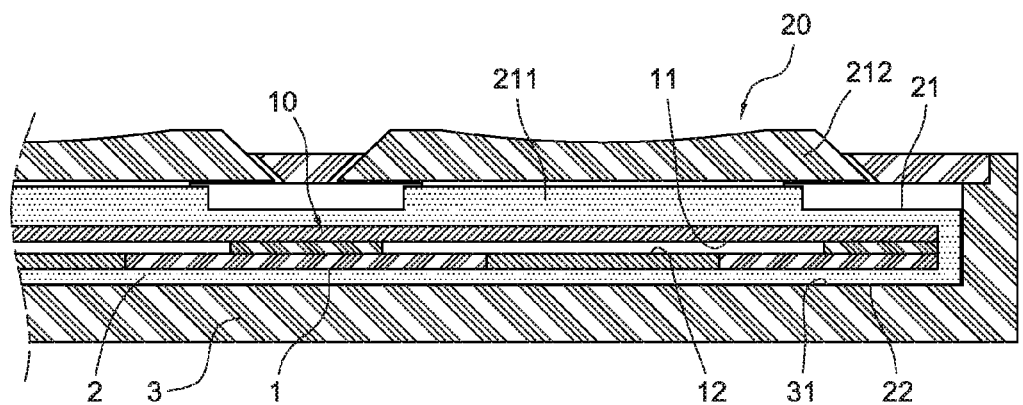
FIG. 5 is a schematic, using view of the in-mould molding touch module, showing that an inner surface of the flexible film is attached on an inner surface of a casing, and each of pressed portions has a pressed key for being prone to be pressed.
Figure 6:
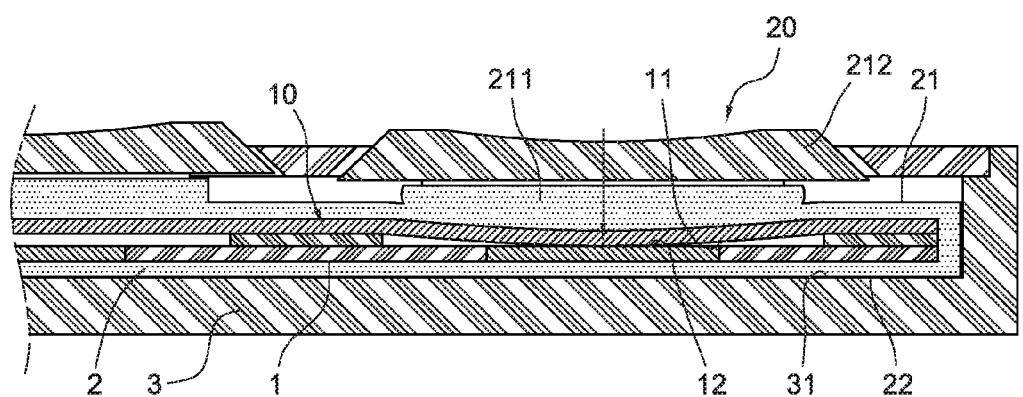
FIG. 6 is another schematic, using view of the in-mould molding touch module, showing that the pressed key is pressed to press the touch control circuit of the flexible printed circuit by the pressed portions, such that the first conducting terminals contact with the second conducting terminals.

The touch module 20 of the present invention may be served as a touch panel of electronic products. The touch module 20 may be arranged on a casing 3 of the electronic products or therein (as shown in FIG. 5) to make the inner surface 22 of the flexible film 2 attached on the casing 3 or the inner surface 31 of the electronic products, and may have a pressed key 212 arranged on the top of the pressed portions 211. The pressed key 212 is prone to be pressed by the fingers. The users may press the pressed key 212 of the outer surface 21 to make the pressed portions 211 press the touch control circuit 10 of the flexible printed circuit 1, such that the first conducting terminal 11 moves downwards to contact with the second conducting terminal 12 (as shown in FIG. 6) for connecting the first conducting terminal 11 and the second conducting terminal 12, and for producing current signals or voltage signals for distinguishing coordinate values. These signals are then converted and outputted into hosts for performing touch commands. Therefore, the ladderlike thickness and gap arranged between the joint surfaces in the conventional art may be eliminated, and no dusts congregate therein. The process of the touch module 20 is simple, and the touch module 20 has a thin thickness.

Figure 7:
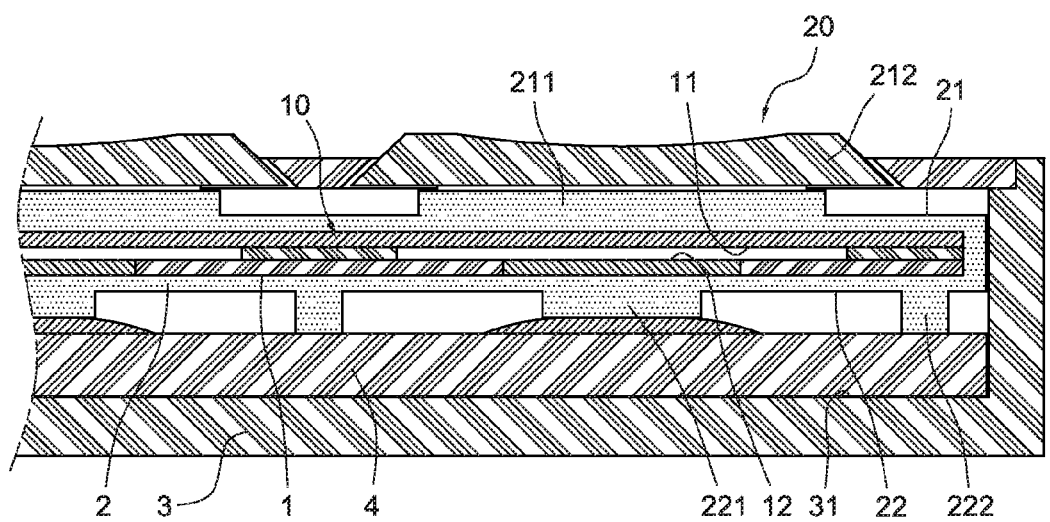
FIG. 7 is still another schematic, using view of the in-mould molding touch module, showing that supporting portions correspond to the pressed portions respectively, for supporting and contacting the bottoms of the touch control positions of the flexible printed circuit.

Furthermore, the touch module 20 may be arranged on a circuit board 4, which is arranged in the casing 3 (as shown in FIG. 7). The inner surface 22 of the flexible film 2 has a plurality of supporting portions 221, 222 attached respectively on the top of the circuit board 4 in the casing 3, to support the flexible film 2 and the flexible printed circuit 1. Some supporting portions 221 corresponds to the pressed portions 211 respectively, to support and contact the bottom of the touch control positions 101 (as shown in FIG. 3) of the flexible circuit board 1. Others are same to the above embodiment.

The flexible film 2 may be made of a material, which fits the high temperature of the above manufacturing process.

The present invention employs the flexible film 2 to contain the flexible printed circuit 1, 1a, such that the corresponding process may be simple in the injecting machine having auto incoming stock and outcoming stock functions. Therefore, the present process can improve the efficiency. Compared with the conventional arts, the present process may be simplified, and the time and the cost may be decreased.

The above description is given by way of example, and no limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An in-mould molding touch module comprising:
   a flexible printed circuit having a touch control circuit; and
   a molding flexible film containing integratedly the flexible printed circuit by an in-mould injecting mode, the flexible film having an outer surface for touch control, said outer surface having a plurality of pressed portions for distinguishing a touch control position of the flexible printed circuit, said touch control position having a first conducting terminal oppositely displaced from a second conducting terminal to define a gap therebetween;
   whereby each of said pressed portions has a pressed key formed thereon and applying a downward pressure on said pressed key deflects said first conducting terminal to contact said second conducting terminal;
   wherein the outer surface is configured for being pressed to drive the touch control circuit of the flexible printed circuit to output signals and the outer surface and the pressed portions are one-piece.

2. The in-mould molding touch module as claimed in claim 1, wherein the flexible film is made of rubber.

3. The in-mould molding touch module as claimed in claim 1, wherein the molding flexible film further comprises an inner surface for supporting.

4. The in-mould molding touch module as claimed in claim 3, wherein the inner surface has a plurality of supporting portions for supporting the flexible film and the flexible printed circuit and corresponding to the pressed portions respectively, and the inner surface and the supporting portions are one-piece.

* * * * *